United States Patent Office 2,948,710
Patented Aug. 9, 1960

2,948,710

SUSPENSION POLYMERIZATION IN THE PRESENCE OF TRICALCIUM PHOSPHATE AND SODIUM BETANAPHTHALENE SULFONATE

Gaetano F. D'Alelio, South Bend, Ind., and Melvin Silberberg, Worcester, Mass., assignors, by mesne assignments, to Foster Grant Co., Inc., Leominster, Mass., a corporation of Delaware No Drawing. Filed July 29, 1957, Ser. No. 674,556

10 Claims. (Cl. 260—85.5)

This invention relates to preparation of polymer beads by an aqueous suspension process for polymerizing a composition comprising at least one polymerizable ethylenic monomer. In particular, it relates to the preparation of polymer beads by polymerizing a stable aqueous suspension of compositions comprising at least one vinyl aromatic monomer.

U.S. Patent 2,673,194, issued to Grim, describes aqueous suspension polymerization utilizing a finely divided phosphate such as tricalcium phosphate together with an anionic surface-active agent in an amount between about 0.0005% and 0.05% by weight of the total suspension. Grim states that the amounts of such surface-active agents are effective only in this very narrow range, if stable dispersions are to be obtained. However, we have found that when Grim's anionic surface-active agents are used as taught and claimed in his patent, separation and purification of the formed polymer is often difficult. Thus, for example, when dodecylbenzene sodium sulfonate (Nacconol NRSF) is used with styrene, there is slime, foam, some large beads, and a tendency to clog filter screens.

In accordance with this present invention, small beads are formed which are easily separated and purified. This is accomplished by use of an anionic wetting agent not specifically disclosed by Grim and in a manner contrary to the teachings of the Grim patent. We have been able to obtain this improved aqueous suspension polymerization of compositions comprising at least one polymerizable ethylenic monomer by use of sodium betanaphthalene sulfonate in the range of approximately 0.1–2.00% by weight of total suspension in conjunction with finely divided tricalcium phosphate as the suspending agent. The preferred range of the sodium betanaphthalene sulfonate is 0.4–0.75% by weight of the total suspension. It is also preferred that the suspension contain at least approximately 0.3% finely divided tricalcium phosphate by weight of total monomers. The tricalcium phosphate preferably has an average particle size in the range 35–50 microns.

Although the process is applicable broadly to compositions comprising at least one ethylenic monomer, it is particularly useful with polymerizable compositions comprising at least one vinyl aromatic monomer, as for example, styrene and copolymers thereof. The catalyst, time and temperature can be varied according to the desired product as is customary in such polymerizations, and are not considered part of this invention.

Several specific but non-limiting examples of this invention are given below. Sodium betanaphthalene sulfonate can be used pure or can contain inert ingredients, e.g. the 88% active compound of American Cyanamid, "Beta Naphthalene Sodium Sulfonate" described in their Technical Data Sheet N)-3-1055-02. The tricalcium phosphate used in the following examples was Victor Chemical Co. NF grade.

EXAMPLE I 1230 grams water
815 grams styrene
3.5 grams tricalcium phosphate (finely divided, average particle size 42 micron)
1.64 grams benzoyl peroxide
8.8 grams sodium betanaphthalene sulfonate The ingredients were suspended together in a vessel equipped with an agitator and reflux condenser and surrounded by a water bath. This aqueous suspension was maintained at 90° C. and 600 revolutions per minute stirrer agitation for 10 hours. The result was a stable suspension with small clear beads easily purified and washed to give material with no haze and a good color. Examples II and III below, performed under similar temperature and agitation conditions as Example I, gave substantially similar results.

EXAMPLE II 1230 grams water
24.5 grams methylmethacrylate
790.5 grams styrene
4.76 grams tricalcium phosphate (finely divided, average particle size 42 micron)
1.64 grams benzoyl peroxide
17.6 grams sodium betanaphthalene sulfonate

EXAMPLE III 1230 grams water
815 grams styrene
16.4 grams vinyl stearate
4.76 grams tricalcium phosphate (finely divided, average particle size 42 micron)
2.3 grams benzoyl peroxide
17.6 grams sodium betanaphthalene sulfonate High yields of styrene copolymerized with alphamethyl styrene were obtained at 90° C. and 600 r.p.m. agitation for 24 hours with the following formula:

EXAMPLE IV 1230 grams water
815 grams styrene
41 grams alphamethylstyrene
4.76 grams tricalcium phosphate (finely divided, average particle size 42 micron)
3.26 grams benzoyl peroxide
17.6 grams sodium betanaphthalene sulfonate The following two examples are of copolymers of styreneacrylonitrile prepared in accordance with this invention at 75° C., 600 r.p.m. agitation:

EXAMPLE V

*72-styrene-28-acrylonitrile*

1110 grams water
375 grams styrene
148 grams acrylonitrile
4.5 grams tricalcium phosphate (finely divided, average particle size 42 microns)
1.5 grams benzoyl peroxide
3.55 grams sodium betanaphthalene sulfonate Hard beads were formed after 5 hours. The use of 7.10 or 14.2 grams of sodium betanaphthalene sulfonate in the above example gave equally good results.

EXAMPLE VI

*95-styrene-5-acrylonitrile*

1110 grams water
500 grams styrene
25 grams acrylonitrile
4.5 grams tricalcium phosphate (finely divided, average particle size 42 microns)

3.0 grams benzoyl peroxide
3.55 grams sodium betanaphthalene sulfonate

Hard beads were formed in 10 hours.

We claim:
1. In a process for preparing polymer beads, the step of polymerizing in a stable aqueous suspension a polymerizable composition comprising at least one suspension-polymerizable vinyl aromatic monomer, said suspension comprising finely divided tricalcium phosphate as the stabilizing agent and containing an amount of sodium betanaphthalene sulfonate in the range of 0.1 to 2.00% by weight of total suspension.
2. The process of claim 1, wherein the polymerizable composition comprises a mixture of styrene and methylmethacrylate.
3. The process of claim 1, wherein the polymerizable composition comprises a mixture of styrene and alpha-methylstyrene.
4. The process of claim 1, wherein the polymerizable composition comprises a mixture of styrene and vinyl stearate.
5. The process of claim 1, wherein the polymerizable composition comprises a mixture of styrene and acrylonitrile.
6. The process of claim 1 wherein said suspension comprises at least approximately 0.3% by weight of total monomers of a finely divided tricalcium phosphate of an average particle size of approximately 35 to 50 microns.
7. In a process for preparing polymer beads, the step of polymerizing in a stable aqueous suspension a polymerizable composition comprising at least styrene, said suspension comprising finely divided tricalcium phosphate as the stabilizing agent and containing an amount of sodium betanaphthalene sulfonate in the range of 0.1 to 2.00% by weight of total suspension.
8. The process of claim 7 wherein said suspension comprises at least approximately 0.3% by weight of total monomers of a finely divided tricalcium phosphate of an average particle size of approximately 35 to 50 microns.
9. In a process of preparing polymer beads, the step of polymerizing in a stable aqueous suspension a polymerizable composition comprising at least one suspention-polymerizable vinyl aromatic monomer, said suspension comprising finely divided tricalcium phosphate as the stabilizing agent and containing an amount of sodium betanaphthalene sulfonate in the range of 0.4 to 0.75% by weight of total suspension.
10. In a process for preparing polymer beads, the step of polymerizing in a stable aqueous suspension a polymerizable composition comprising at least styrene, said suspension comprising finely divided tricalcium phosphate as the stabilizing agent and containing an amount of sodium betanaphthalene sulfonate in the range of 0.4 to 0.75% by weight of total suspension.

References Cited in the file of this patent
UNITED STATES PATENTS

| | | |
|---|---|---|
| 2,652,392 | Hohenstein et al. | Mar. 23, 1953 |
| 2,673,194 | Grim | Mar. 23, 1954 |